UNITED STATES PATENT OFFICE.

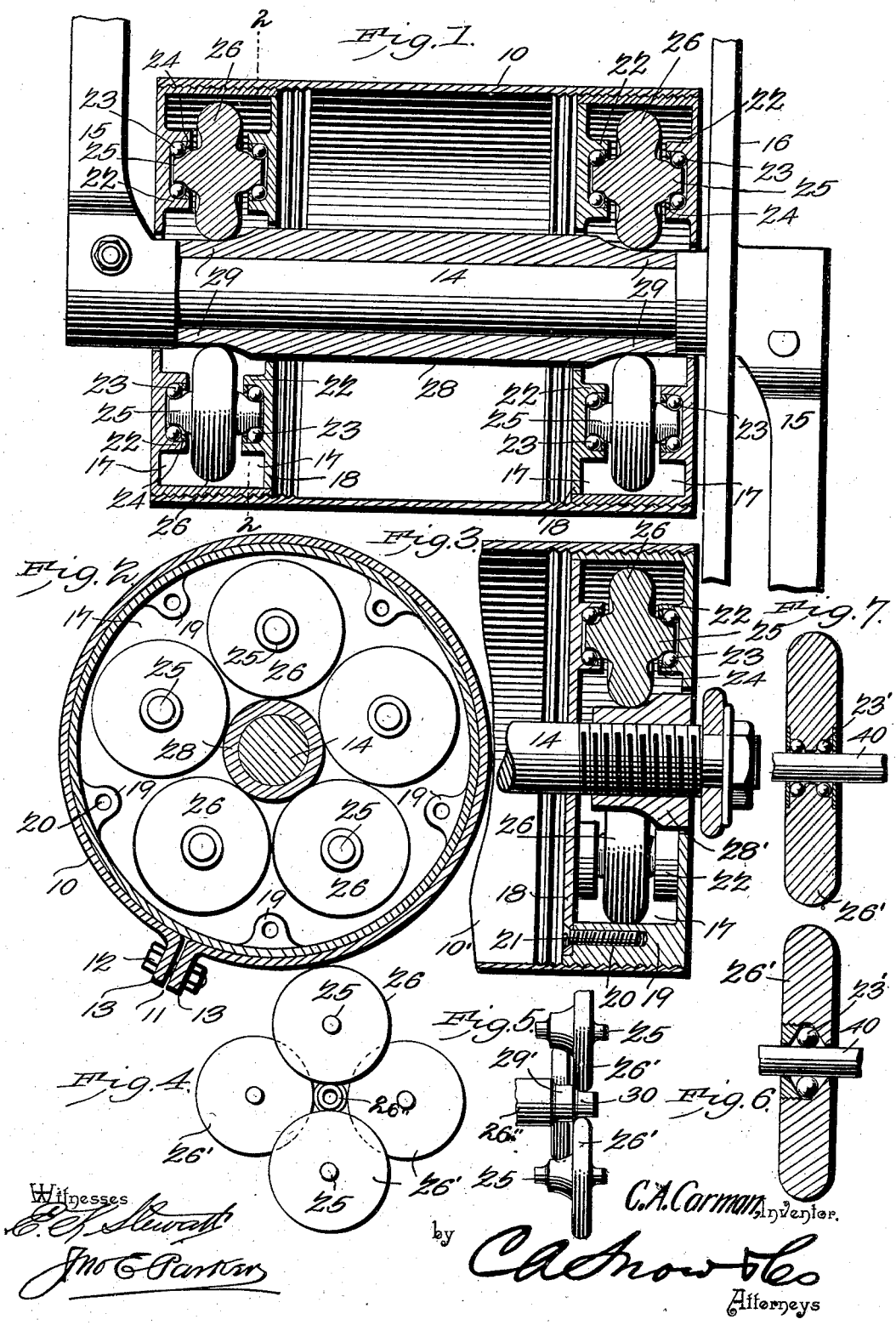

CLARENCE A. CARMAN, OF BAYSHORE, NEW YORK, ASSIGNOR OF ONE-THIRD TO BENJAMIN P. FIELD, OF BABYLON, NEW YORK.

ROLLER-BEARING.

SPECIFICATION forming part of Letters Patent No. 709,136, dated September 16, 1902.

Application filed January 17, 1902. Serial No. 90,211. (No model.)

*To all whom it may concern:*

Be it known that I, CLARENCE A. CARMAN, a citizen of the United States, residing at Bayshore, Long Island, in the county of Suffolk and State of New York, have invented a new and useful Roller-Bearing, of which the following is a specification.

My invention relates to certain improvements in roller-bearings for axles, and is particularly adapted for use in connection with the crank-shafts and rear or front axle mechanisms of bicycles and other light vehicles.

The principal object of the invention is to provide a simple and economical form of bearing in which the friction will be reduced to a minimum and in which suitable provision is made for taking up any wear which may occur in the rollers or the surfaces with which they are in contact.

With these and other objects in view the invention consists in the novel construction and combination of parts hereinafter described, illustrated in the accompanying drawings, and particularly pointed out in the appended claims.

In the drawings, Figure 1 is a longitudinal sectional elevation of a crank-hanger and shaft provided with a roller-bearing constructed and arranged in accordance with my invention. Fig. 2 is a transverse sectional elevation of the same on the line 2 2, Fig. 1. Fig. 3 is a longitudinal sectional elevation of the bearing as constructed for application to the rear-wheel axle of a bicycle or other stationary shaft. Fig. 4 is a transverse sectional elevation illustrating a modified construction. Fig. 5 is a longitudinal sectional elevation of a portion of the structure illustrated in Fig. 4. Figs. 6 and 7 are sectional views illustrating modifications of the invention.

Similar numerals of reference are employed to indicate corresponding parts throughout the several figures of the drawings.

10 designates a crank-hanger of ordinary construction, which may be connected in the usual manner to the frame of the bicycle, the end portions of the crank-hanger being provided with longitudinal slits 11, which may be clamped together by suitable bolts 12 passing through lugs 13 in order to clamp the bearing members firmly in position.

The crank-shaft 14 may be of any ordinary construction and carries, as usual, a pair of pedal-cranks 15 and a sprocket-wheel 16. The construction of this portion of the mechanism may be that followed on machines of any class, and the construction herein shown being that of the ordinary form of bicycle.

The opposite ends of the crank-hanger are provided with internal screw-threads for the reception of cylindrical boxes 17, in which the bearing-rollers are supported, the boxes being screwed in place and then clamped firmly in adjusted position by the bolts 12.

The box 17 is provided with a movable cover in the form of a disk 18, which rests on lugs 19, projecting inwardly from the periphery of the box and provided with threaded openings 20 for the reception of securing-screws 21, which serve to confine the disk in position. Projecting inwardly from the bottom of the box and the disk 18 are a series of annular flanges 22, forming ball-races for the reception of antifriction-balls 23, which are confined in place by small rings 24, which are forced within the flanges or are provided with screw-threads adapted to internal threads formed to said flanges. The ball-races are arranged in longitudinally-alining pairs, each pair being adapted for the reception of suitably-shaped shaft or trunnion members 25 of disk rollers 26, the peripheral portions of the rollers being curved in cross-section in order to reduce the frictional contact with the surface on which they bear.

If necessary, the rollers might bear directly upon the axle or shaft; but in order to avoid wear and to compensate for wear when necessary I place on the axle or shaft a sleeve 28, preferably of a length approximately equal to that of the crank-hanger, the opposite ends of said sleeve being provided with reduced bearing members 29, which preferably are tapering or slightly curved and adapted to bear against the roller-disk 26. The sleeve is fitted snugly to the shaft and rotates with the latter, the roller-supports being stationary and affording a bearing member in which the friction is reduced to a minimum. When the bearing member 29 or the peripheries of the rollers become worn from constant use, the cylindrical boxes 17 are moved toward each other by turning them in the threaded crank-hanger, the clamping-nuts 12 being loosened for the purpose and then tightened after the proper adjustment has been secured. As the peripheral portions of the rollers are semicircular in cross-section and the wear is a trifle to one side of the longitudinal center of said rollers, the latter may be reversed when one side is worn and a fresh surface presented for contact with the bearing member 29.

The construction is such that the bearings will be readily assembled or disassembled by unscrewing the boxes from the crank-hanger and removing the securing-screws 21. The rollers may then be readily removed and cleaned or reversed, the antifriction-balls being confined in place by the rings 24.

In applying the device to a stationary shaft or axle—as, for instance, the rear-wheel axle of a bicycle—the construction may be precisely the same as that illustrated in Figs. 1 and 2, with the exception of the sleeve 28. On a stationary shaft or axle I place an adjustable cone 28', adapted to screw-threads on the axle, as illustrated in Fig. 3, in order that it may be readily adjusted to compensate for wear. In this case the portion 10' represents a hub of the rear wheel, and the rear sprocket may be secured thereto in any desired manner.

In some cases I have found it desirable to employ roller-disks considerably larger in diameter than those illustrated in Figs. 1 and 2, and in such cases I preferably arrange the rollers in different planes, as illustrated in Figs. 4 and 5. In this construction the crank-hanger, the bearing-box, and antifriction-balls remain substantially the same as that illustrated in Fig. 1, the box being somewhat wider and the roller-disks 26' being considerably larger in diameter and arranged in two series, each series being disposed in a different plane. The sleeve 26" is provided with two bearing members 29' and 30, one being slightly larger in diameter than the other, and the disk rollers being of corresponding size in order not to increase the diameter of the crank-hanger, or the rollers may be of the same size and the axes of one set be disposed at a greater distance from the center of the shaft than those of the other set.

In some cases I may employ a stationary axle or shaft 40 for the support of the roller-disk, as illustrated in Figs. 6 and 7. In such cases the roller-disk 26' is provided with ball-bearings 23', bearing directly on said stationary shaft, and a single set of antifriction-rollers may be used, as shown in Fig. 6, or a double set, as shown in Fig. 7.

While the construction herein described and illustrated in the accompanying drawings is the preferred form of the device, it is obvious that many changes in the form, proportions, size, and minor details of construction may be made without departing from the spirit or sacrificing any of the advantages of my invention.

Having thus described my invention, what I claim is—

1. The combination in a bearing, of the bearing-box, a removable lid thereon, an annular series of ball-races each comprising an annular flange, antifriction-balls adapted to said ball-races, holding-rings carried by the flanges for retaining said balls in position, disk rollers having curved peripheries and adapted to the bearings formed by said balls, substantially as specified.

2. The combination in a bearing, of the longitudinally-adjustable bearing-box having a series of inwardly-projecting lugs, a disk adapted to be seated on said lugs, means for securing the disk in position, an annular series of bearings arranged in longitudinally-alining pairs on the box and disk, and reversible roller-disks having shafts or trunnions adapted to said bearings.

3. The combination in a bearing, of the support 10 having internal threads, a longitudinally-adjustable bearing-box 17 adapted to the threads at each end of the support, a series of inwardly-projecting lugs 19 carried by the bearing-box, a disk 18 adapted to be seated on and secured to said lugs, a series of annular flanges 22 carried by the box and disk and arranged in longitudinally-alining pairs, antifriction-balls 23 adapted to ball-races formed by said flanges, rings 24 for holding said balls in position, disk rollers 26 having shafts or trunnions 25 adapted to be supported by the antifriction-balls, a shaft 14, and a sleeve 28 carried by said shaft and having bearing-surfaces 29 for contact with the disk rollers, substantially as specified.

4. The combination in a bearing, of a plurality of sets of disk rollers arranged side by side, the edges of one set overlapping the edges of the adjacent set, bearing-supports for said disk rollers, and a bearing-sleeve having separate inclined bearing-surfaces for each set of disk rollers.

In testimony that I claim the foregoing as my own I have hereto affixed my signature in the presence of two witnesses.

CLARENCE A. CARMAN.

Witnesses:
J. ROSS COLHOUN,
JNO. E. PARKER.